Jan. 7, 1947. R. SIMPSON 2,413,848
ILLUMINATED INSTRUMENT
Filed Feb. 2, 1944 2 Sheets-Sheet 1
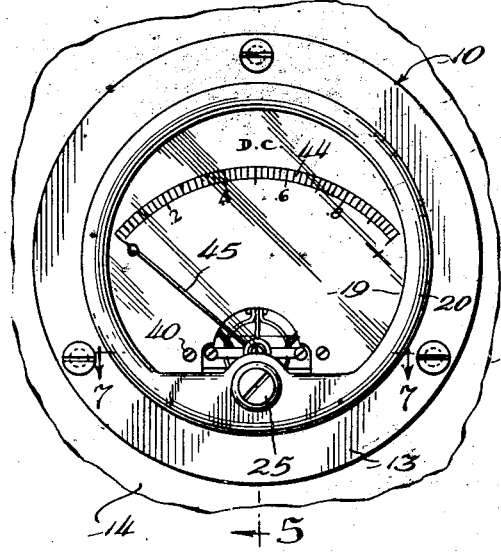
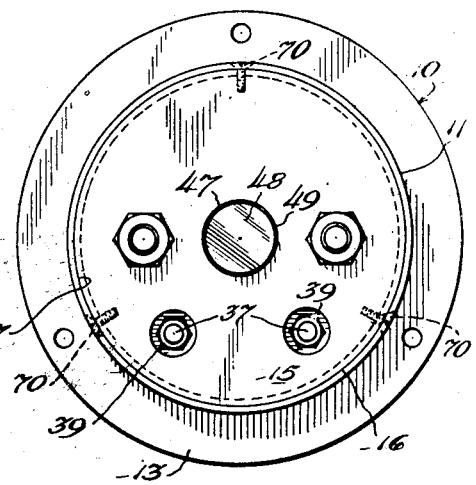
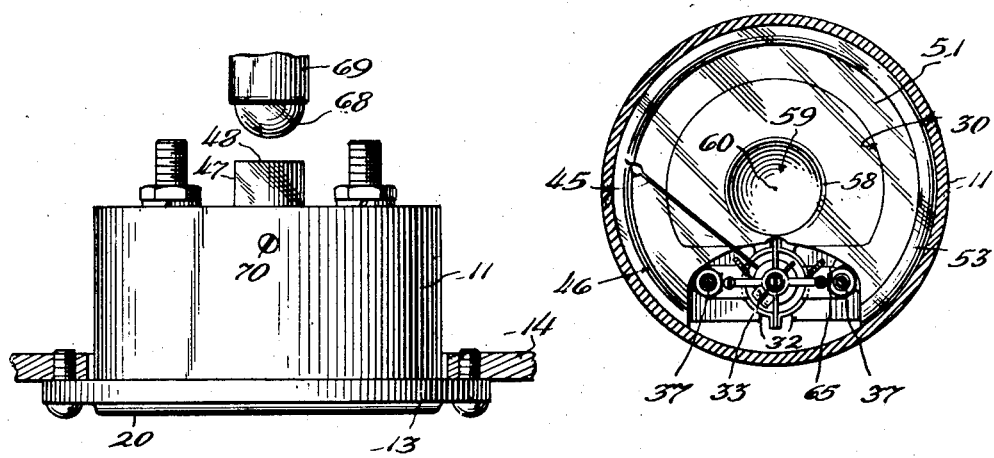
Inventor
Ray Simpson
By McCaleb, Wendt & Dickinson
Attorneys

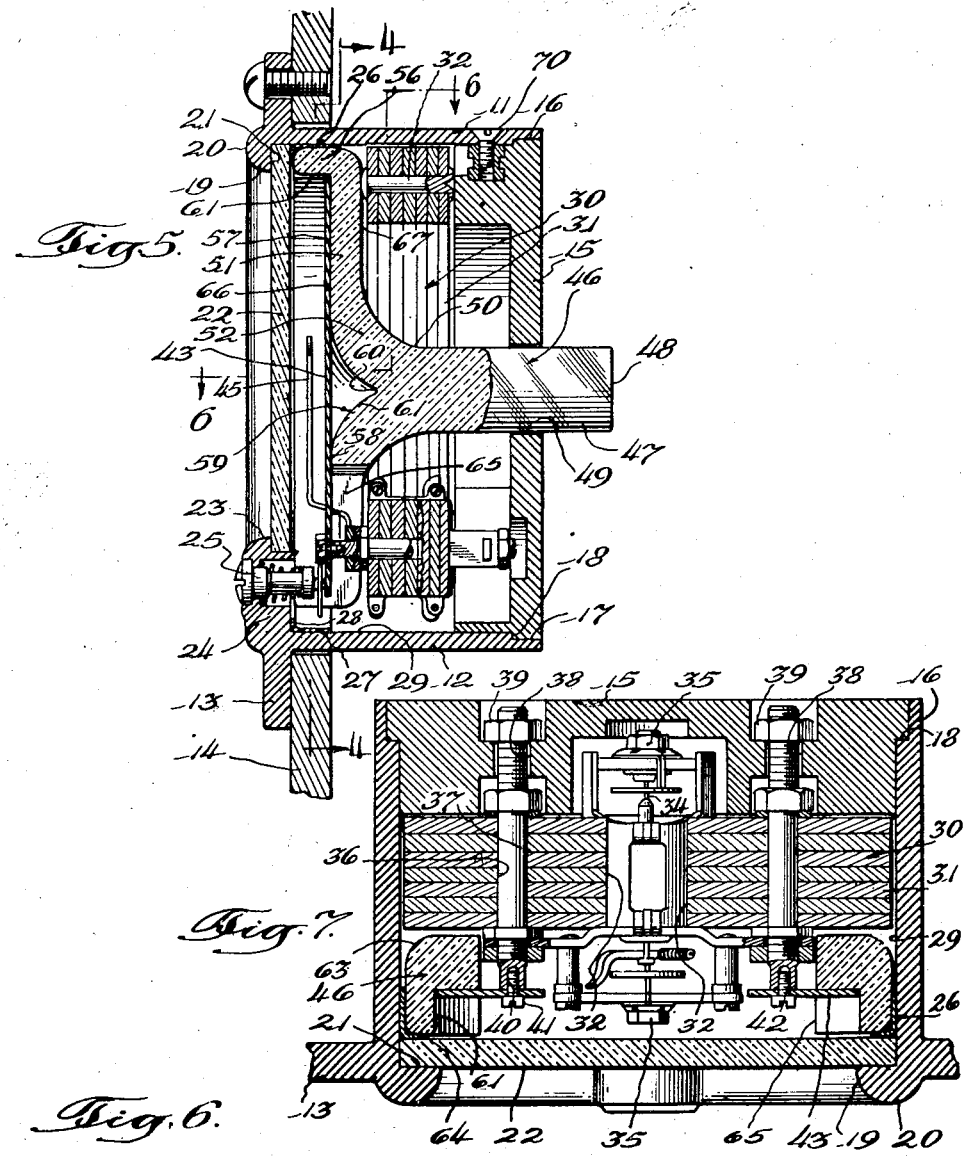

Patented Jan. 7, 1947

2,413,848

UNITED STATES PATENT OFFICE 2,413,848

ILLUMINATED INSTRUMENT

Ray Simpson, River Forest, Ill.

Application February 2, 1944, Serial No. 520,787

9 Claims. (Cl. 240—2.1)

1

The present invention relates to illuminated instruments, and is particularly concerned with the illumination of various kinds of instruments employing a dial and pointer or other similar indicating means, such as electrical measuring instruments.

While the invention is peculiarly adapted to be used for meters of the type having a hollow space in the center for a central location of the light source, it may also be utilized upon other types of measuring instruments in which the location of the light-conducting body may be suitably adjusted to the structure of the instrument.

One of the objects of the invention is the provision of an improved illuminated instrument in which the dial is more uniformly and adequately illuminated than the devices of the prior art.

Another object of the invention is the provision of an improved illuminated instrument structure which is adapted to illuminate the pointer and dial uniformly and permits the location of the source of illumination outside of the housing so that errors are not introduced into the reading of the instrument by the heat generated by the electric bulb used for a light source.

Another object of the invention is the provision of an improved illuminated instrument structure of the class described, in which the source of illumination may be disposed at the back of the instrument and in which the light is uniformly and symmetrically conducted to all parts of the dial which require illumination, so as to eliminate any shadows on the dial or any errors due to imperfect illumination.

Another object of the invention is the provision of an improved illuminated electrical instrument structure which is sturdy, capable of economical manufacture, simple, and adapted to be easily assembled and used for a long period of time without necessity for repair or replacement of the illuminating structure.

Another object of the invention is the provision of an improved illuminating structure for instruments which is adapted to effect a much more uniform illumination of the dial or pointer or other structures to be illuminated, with the use of a minimum light.

Other objects and advantages of the invention will be apparent from the following description and the accompanying drawings, in which similar characters of reference indicate similar parts throughout the several views.

Referring to the drawings, of which there are two sheets, Fig. 1 is a front elevational view of an electrical instrument, such as a milliammeter, embodying my invention;

2

Fig. 2 is a rear elevational view;

Fig. 3 is a top plan view, showing the instrument on a panel;

Fig. 4 is a front elevational view of the illuminating structure, with the dial removed, taken on the plane of the line 4—4 of Fig. 5;

Fig. 5 is a vertical sectional view, taken on the plane of the line 5—5 of Fig. 1, looking in the direction of the arrows;

Fig. 6 is a fragmentary sectional view, taken on the plane of the line 6—6 of Fig. 5, looking in the direction of the arrows;

Fig. 7 is a horizontal sectional view, taken on the plane of the line 7—7 of Fig. 1, looking in the direction of the arrows.

Referring to Figs. 1 to 3, 10 indicates in its entirety the illuminated electrical instrument, which is preferably enclosed in a housing 11 that may be made of any suitable material. For example, the housing may consist of a cylindrical member 11, the cylindrical wall 12 of which may be constructed of insulation, such as a molded phenolic condensation product having a radially extending face flange 13 for engaging the outside of a panel 14.

The back of the instrument is closed by an insulating back wall 15 of similar material, which is circular in shape and provided at its edge with a cylindrical surface 16 fitting in a cylindrical bore 17 against an annular shoulder 18 carried by the side wall 12.

The front of the instrument may be provided with an inwardly projecting flange 19 having a curved outer surface 20 and a flat inner annular shoulder 21 for engaging the glass 22 or other transparent member which encloses the front or face of the instrument.

The opening 23, which is closed by the glass 22, may be substantially circular, except at the lower side, where a portion 24 of the housing extends across the face for supporting the adjustment screw 25.

The transparent member 22 of glass or suitable plastic is preferably held in place by engagement of its face with the shoulder 21 and engagement of its rear side by means of a bezel ring 26. The bezel ring 26 may consist of a suitable metal member, preferably made of non-magnetic metal, such as brass, having a cylindrical flange 27 and a plane annular flange 28.

The cylindrical flange 27 has a frictional fit against the inner cylindrical surface 29 of the side wall 12, and the annular flange 28 engages the rear side of the transparent member 22 and holds it against the shoulder 21.

The present illuminating arrangements may be used with various types of instruments, and the instrument which has been selected to illustrate the invention is an electrical instrument, such as a milli-ammeter of the moving coil type. The details of such an instrument are disclosed in my prior Patent No. 2,051,399, issued August 18, 1936, to which the present instrument may correspond in so far as the details of the instrument are concerned.

Such an instrument has a suitable permanent magnet 30, which is preferably formed of a plurality of laminations 31 secured together by rivets 32 or other suitable fastening means, and the permanent magnet 30 has a pair of opposed poles 32 located adjacent the moving coil 33, which is suitably mounted by means of a spindle 34 in jewels 35.

The permanent magnet has a pair of bores 36 for receiving the threaded members 37, which project from the back of the instrument movement and pass through bores 38 in the rear wall 15 for securing the movement to the rear wall by means of nuts 39.

The threaded members 37 also project from the front of the instrument, where they are provided with threaded bores 40 for receiving the screw bolts 41 which pass through apertures 42 in the dial plate 43, and are threaded into the bores 40 to secure the dial plate to the movement.

The dial plate preferably consists of an opaque member, such as a sheet metal member, the face of which is covered with a sheet of paper adhesively secured to the metal plate and provided with suitable indicia 44 for indicating the units which the instrument is measuring by means of the pointer 45 that is carried by the moving coil assembly 33.

In order to convey light uniformly to the face of the dial and illuminate it from a source located outside of the housing, the instrument is provided with a light-conducting member, indicated in its entirety by the numeral 46. This light-conducting member may have a substantially cylindrical stem 47, which is provided with a rear plane surface 48, the cylindrical stem passing through a bore 49 in the rear wall 15 and extending into proximity with the front plane of the magnet 30.

At the point 50 the stem 47 curves outward and is integrally attached to a partially circular disc 51 by means of the outwardly curved portion 52. The size of the disc 51 is such that it will fit in the housing below the dial plate 43 and above the magnet 30.

The disc 51 is provided at its outer edge with an axially extending cylindrical wall 53 of sufficient length to extend past the dial plate 43 into engagement with the flange 28 of bezel ring 26. The cylindrical flange 27 of the bezel ring 26 embraces the cylindrical portion 56 of the light-conducting member 46.

The front surface 57 of the disc portion 51 may be plane from the cylindrical flange 56 to a point 58, where the light-conducting member 46 is provided with a tapered depression 59, the wall of which corresponds to a surface of revolution, and the shape of which is such that the curved portion 52 is of substantial thickness, until the point where it joins the disc portion 51.

The recess 59 tapers to a pointed apex 60 and the inside of the surface 61 of the wall serves to reflect light which impinges upon it and to cause the light to be conducted uniformly in a radial direction into the disc portion 51, and thence into the cylindrical portion 56.

The cylindrical flange 56 is preferably provided with a smooth inner cylindrical surface 61, from which light emerges on all sides of the dial except the lower side, where the movement is located.

This portion 56 may be provided with an easy curvature at its outer rear corner 63 and with a forward plane surface 64.

As viewed in plan in Fig. 4, this light-conducting member 46 has its disc portion 51 cut away at 65 adjacent the moving coil and provided with a recess of sufficient size to pass the two threaded members 37 so that the light-conducting member may be moved into position about the moving coil assembly by means of the open recess or slot 65.

The light-conducting member 46 is held in place at its rear stem 47 by means of its engagement with the walls of the bore 49, and at its front end by its engagement with the housing wall at the bezel ring 26. It is confined against axial movement by being engaged on its front plane surface 66 by the rear side of the dial plate and by being engaged at its rear plane surface 67 by the permanent magnet assembly 30.

The light-conducting member 46 is preferably made of some suitable transparent plastic, such as one which is available on the market under the trade name "Lucite," and the light-conducting plastic is preferably selected from the point of view of its ability to conduct light with minimum loss of light.

In some embodiments of the invention the light-conducting member may be made of quartz or glass.

Referring to Fig. 3, 68 indicates an electric bulb carried by a tubular socket 69 and having a suitable source of energization, and the bulb 68 is disposed in alignment with the stem 47 and closely adjacent to the end 48 of the stem 47.

In some embodiments of the invention the source of illumination 68 may consist not only of the bulb, but a suitable system of projecting lenses, and the bulb may be of the projection type, that is, having a relatively wide and flat filament to provide a source of light of high intensity.

Ordinarily, small electric bulbs are, however, capable of providing sufficient light to illuminate the dial of small instruments of the type illustrated.

The light-conducting member 46, instrument movement, and magnet 30, and the rear wall 15 may all be removed from the instrument housing 11 as a unit, and they are preferably secured in this housing by a plurality of radially extending screw bolts 70, which pass through the wall 12 and are threaded into the edge of the rear wall 15.

The operation of the illuminating structure is as follows: The light from the bulb 68 passes in at the rear face 48 of the stem 47 of the light-conducting member 46 and passes down the stem to the point 60, where the stem diverges into a disc. Light is then conducted outwardly and spread uniformly and radially in the disc portion 51 until the disc merges into the cylindrical flange 56, into which the light is carried. The light then emerges from the inner cylindrical surface 61 and impinges on the face of the dial 43, which it illuminates uniformly from all directions about the periphery of the dial, except of course that portion at the lower part of the dial, where the moving coil assembly is located. The light-conducting member 46 has a slot 65 to accommodate such an assembly.

It happens that the indicia 44 are located adjacent the upper part of the dial illumination, and not required at the bottom part. The bezel ring 26 may assist in some degree in reflecting light which would otherwise tend to pass out of the outer cylindrical surface of the flange 56, thereby increasing the illumination of the dial, but such bezel ring is not necessary, and other modes of securing the window in place may be used.

It will thus be observed that I have invented an improved illuminating instrument by means of which the light is uniformly distributed over the face of the dial by being applied from all points of the periphery which are adjacent the indicia. As distinguished from the devices of the prior art, which provide localized sources of illumination, my illuminating structure is symmetrically located and constructed, and it provides a uniform and intense illumination of a diffused character on the important parts of the dial.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a measuring instrument, the combination of an instrument assembly having a supporting body provided with an aperture extending through said body, said instrument having a dial plate, and means for securing said dial plate to said supporting body, a light conducting member having a stem extending through the said aperture, and having a radially extending disc confined between said dial plate and said body, said radially extending disc carrying a circumferentially extending portion which projects forwardly beyond the edge of said dial plate and conducts illumination that is applied to the end of said stem, to the face of said dial plate.

2. In a measuring instrument, the combination of an instrument assembly having a supporting body provided with an aperture extending through said body, said instrument having a dial plate, and means for securing said dial plate to said supporting body, a light-conducting member having a stem extending through the said aperture, and having a radially extending disc confined between said dial plate and said body, said radially extending disc carrying a circumferentially extending portion which projects forwardly beyond the edge of said dial plate and conducts illumination that is applied to the end of said stem, to the face of said dial plate, said stem being formed with a tapered recess having a surface of revolution with its axis disposed in the axis of said stem immediately behind said dial plate.

3. In a measuring instrument, the combination of an instrument assembly having a supporting body provided with an aperture extending through said body, said instrument having a dial plate, and means for securing said dial plate to said supporting body, a light-conducting member having a stem extending through the said aperture, and having a radially extending disc confined between said dial plate and said body, said radially extending disc carrying a circumferentially extending portion which projects forwardly beyond the edge of said dial plate and conducts illumination that is applied to the end of said stem, to the face of said dial plate, said stem being formed with a tapered recess having a surface of revolution with its axis disposed in the axis of said stem immediately behind said dial plate, and said stem being substantially cylindrical.

4. In a measuring instrument, the combination of an instrument assembly having a supporting body provided with an aperture extending through said body, said instrument having a dial plate, and means for securing said dial plate to said supporting body, a light conducting member having a stem extending through the said aperture, and having a radially extending disc confined between said dial plate and said body, said radially extending disc carrying a circumferentially extending portion which projects forwardly beyond the edge of said dial plate and conducts illumination that is applied to the end of said stem, to the face of said dial plate, said circumferentially extending portion being substantially cylindrical.

5. In a measuring instrument, the combination of an instrument assembly having a supporting body provided with an aperture extending through said body, said instrument having a dial plate, and means for securing said dial plate to said supporting body, a light-conducting member having a stem extending through the said aperture, and having a radially extending disc confined between said dial plate and said body, said radially extending disc carrying a circumferentially extending portion which projects forwardly beyond the edge of said dial plate and conducts illumination that is applied to the end of said stem, to the face of said dial plate, and cylindrical light-reflecting means disposed about said circumferentially extending portion for increasing the light-reflection to the face of said dial.

6. In an illuminated instrument, the combination of an instrument provided with an opaque dial, said dial having indicia on its forward face, a light conducting disc located behind said dial and extending to the edge of said dial, a forwardly projecting circumferentially extending light conducting flange carried by said disc and extending forwardly past the edge of said dial, and a source of illumination applied to a part carried by the rear side of said disc, the light from said source being carried radially through said disc and forwardly through said flange and distributed substantially uniformly on said dial face to illuminate the indicia on said face.

7. In an illuminated instrument, the combination of an instrument assembly having a supporting body provided with a moving needle and an opaque dial adjacent said needle, said body having a recess located behind said dial, with a source of illumination, located behind said opaque dial, and a light conducting member, said light conducting member having a body portion adjacent said source of illumination and having a radially extending disc carried by said body and adapted to be secured between the body and the dial, the said disc extending to the edge of the dial and being provided with a forwardly extending substantially cylindrical rim extending past the edge of the dial into a position adjacent the face of the dial at the periphery of the dial, the said source of illumination transmitting light into said body, which is carried uniformly in a radial direction by said disc to the periphery of the dial, where it is carried forwardly of the dial and played upon the face of the dial from a point forwardly of the periphery of the dial to effect a substantially uniform illumination of the indicia carried by the dial.

8. In an illuminated instrument, the combination of an instrument assembly having a supporting body provided with a moving needle and an opaque dial adjacent said needle, said body having a recess located behind said dial, with a source of illumination, located behind said opaque dial, and a light conducting member, said light conducting member having a body portion adjacent said source of illumination and having a radially extending disc carried by said body and adapted to be secured between the body and the dial, the said disc extending to the edge of the dial and being provided with a forwardly extending substantially cylindrical rim extending past the edge of the dial into a position adjacent the face of the dial at the periphery of the dial, the said source of illumination transmitting light into said body, which is carried uniformly in a radial direction by said disc to the periphery of the dial, where it is carried forwardly of the dial and played upon the face of the dial from a point forwardly of the periphery of the dial to effect a substantially uniform illumination of the indicia carried by the dial, the said dial being secured to the body of said instrument by threaded members and the said dial securing said light conducting member by clamping between the body of the instrument and the rear of the dial.

9. In an illuminated instrument, the combination of an instrument provided with an opaque dial, said dial having indicia on its forward face, a light conducting disc located behind said dial and extending to the edge of said dial, a forwardly projecting circumferentially extending light conducting flange carried by said disc and extending forwardly past the edge of said dial, a source of illumination applied to a part carried by the rear side of said disc, the light from said source being carried radially through said disc and forwardly through said flange and distributed substantially uniformly on said dial face to illuminate the indicia on said face, and a housing for said instrument, having a part enclosing said circumferentially extending flange and having an inwardly extending flange which conceals the edge of said circumferentially extending flange and tends to reflect the light backwardly toward the dial.

RAY SIMPSON.